(12) United States Patent
Stec et al.

(10) Patent No.: US 9,654,627 B1
(45) Date of Patent: *May 16, 2017

(54) ELECTRONIC CARD DELIVERY AND COMMUNICATION CHANNEL INTEGRATION

(71) Applicant: West Corporation, Omaha, NE (US)

(72) Inventors: Kellan Stec, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,403

(22) Filed: Jul. 13, 2015

(51) Int. Cl.
*H04M 3/42* (2006.01)
*H04W 4/14* (2009.01)

(52) U.S. Cl.
CPC ........ *H04M 3/42382* (2013.01); *H04W 4/14* (2013.01); *H04M 3/42059* (2013.01)

(58) Field of Classification Search
USPC .................................................... 379/207.15
See application file for complete search history.

(56) References Cited

U.S. PATENT DOCUMENTS

| 2004/0254859 | A1* | 12/2004 | Aslanian, Jr. ........ G06Q 10/107 705/14.73 |
| 2009/0163196 | A1* | 6/2009 | Van Steenbergen ..... H04M 1/72541 455/422.1 |
| 2013/0137408 | A1* | 5/2013 | Buschner ............. H04Q 3/0029 455/415 |
| 2013/0335201 | A1* | 12/2013 | Kang ................. G06K 7/10366 340/10.5 |

* cited by examiner

*Primary Examiner* — Quynh Nguyen
(74) *Attorney, Agent, or Firm* — Raffi Gostanian

(57) ABSTRACT

Personal information, such as professional information normally associated with a business card may be identified and appended to a messaging sequence to provide automated user profile updates. One example embodiment may transmitting an initiation message from a service provider to a user device to initiate a communication session, transmitting a request message to the user device to accept contact information associated with the service provider, receiving a confirmation message responsive to the request message, transmitting the contact information responsive to receiving confirmation of the request, and automatically initiating a contact information update on the user device.

19 Claims, 9 Drawing Sheets

ELECTRONIC CARD DELIVERY AND COMMUNICATION CHANNEL INTEGRATION

TECHNICAL FIELD OF THE APPLICATION

This application relates to a communication session initiating a caller identification procedure, and more particularly, an automated identification procedure that initiates during a voice call or message session.

BACKGROUND OF THE APPLICATION

Conventionally, when a user operating a calling device (e.g., landline phone, smartphone, mobile phone, Internet phone, etc.) receives a call, the user may or may not recognize the number. For example, many numbers are associated with third parties which the user does not normally receive calls, such as business affiliations (e.g., banks, airlines, retailers, etc.). As a result, those numbers are often confused with spam, automated calls, telemarketers, etc., and the user may decide not to answer the call even though it may be important to the user.

Also, in a similar context, a user may receive various text messages from third parties which relate to services or products which the user may be interested in pursuing but which are not sent from known parties. Also, many retailers and service providers use short codes to communicate with a user's mobile device. In this case, the short code is not a readily recognizable number and will generally not assist the user with a speedy identification of the sender of such short message service (SMS) messages.

SUMMARY OF THE APPLICATION

One example embodiment of the present application may provide a method that includes at least one of transmitting a call from a calling party to a user device and establishing a call channel, transmitting a request to the user device to accept contact information associated with the calling party via a data channel separate from the call channel, receiving confirmation via a confirmation message that the request is accepted, and transmitting the contact information responsive to receiving the confirmation message.

Another example embodiment may include an apparatus that includes at least one of a transmitter configured to transmit a call from a calling party to a user device and establish a call channel, transmit a request to the user device to accept contact information associated with the calling party via a data channel separate from the call channel, and a receiver configured to receive confirmation via a confirmation message that the request is accepted, and the transmitter is further configured to transmit the contact information responsive to receiving the confirmation message.

Another example embodiment may include a non-transitory computer readable storage medium configured to perform at least one of store instructions that when executed causes a processor to perform transmitting a call from a calling party to a user device and establishing a call channel, transmitting a request to the user device to accept contact information associated with the calling party via a data channel separate from the call channel, receiving confirmation via a confirmation message that the request is accepted, and transmitting the contact information responsive to receiving the confirmation message.

Still another example embodiment includes a method configured to perform at least one of transmitting an initiation message from a service provider to a user device to initiate a communication session, transmitting a request message to the user device to accept contact information associated with the service provider, receiving a confirmation message responsive to the request message, transmitting the contact information responsive to receiving confirmation of the request, and automatically initiating a contact information update on the user device.

Still yet another example embodiment includes an apparatus with at least one of a transmitter configured to transmit an initiation message from a service provider to a user device to initiate a communication session, and transmit a request message to the user device to accept contact information associated with the service provider, and a receiver configured to receive a confirmation message responsive to the request message, and the transmitter is further configured to transmit the contact information responsive to receiving confirmation of the request, and automatically initiate a contact information update on the user device.

Still yet another example embodiment includes a non-transitory computer readable storage medium configured to store instructions that when executed causes a processor to perform at least one of transmitting an initiation message from a service provider to a user device to initiate a communication session, transmitting a request message to the user device to accept contact information associated with the service provider, receiving a confirmation message responsive to the request message, transmitting the contact information responsive to receiving confirmation of the request, and automatically initiating a contact information update on the user device.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
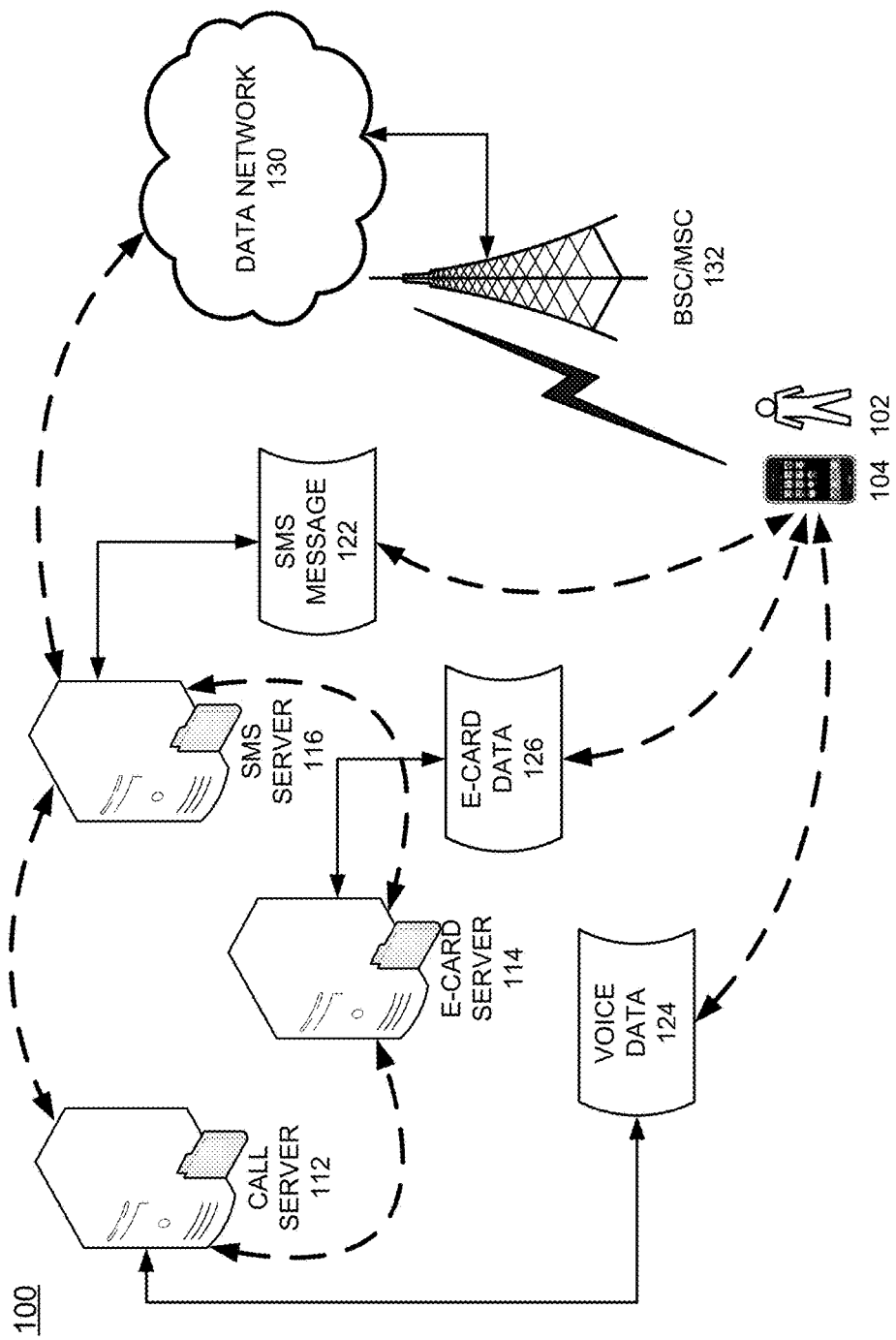
FIG. 1 illustrates an example communication network diagram according to example embodiments of the present application.

FIG. 1 illustrates an example communication network 100 according to example embodiments. Referring to FIG. 1, a user 102 of a mobile device or smartphone 104 may communicate with a communication base station controller and/or mobile switching controller 132 to receive a mobile communication signal as a voice signal and/or a data signal. A data network 130 may provide a communication network to receive and forward communication with one or more communication servers used to initiate communication with the mobile device 104.

According to one example, the user device 104 may receive a call from a third party call server 112, such as an automated call dialer on behalf of a live agent and/or an automated voice call from a service provider seeking to inform the user 102 of a change in service or other type of reminder (i.e. pay bill, new service, etc.). The user generally has no knowledge of the caller's number as the number is usually restricted, not available or is a toll free number that is not known or linked to an identification name or other form of identification. For example, a user's contact list may include a number of different contact tags for each user contact including a user name, photograph, email address, social network link (e.g., FACEBOOK), aliases, etc. However, the unexpected caller or first time caller may have no recognition by the contact library of the user's mobile device.

The caller could easily be identified via an electronic card that is presented to the user or selected by the user's mobile device. An example of an electronic card composition is provided below:

BEGIN:ELECTRONIC CARD
VERSION:4.0
N:Wayne;John;;;
FN:John Wayne
ORG:Old West Co.
TITLE:Cowboy
PHOTO;MEDIATYPE=image/gif:http://www.example.com/dir_phot os/my_photo.gif
TEL;TYPE=work,voice;VALUE=uri:tel:+1-111-555-1212
TEL;TYPE=home,voice;VALUE=uri:tel:+1-404-555-1212
ADR;TYPE=work;LABEL="123 Main street\nOld West, CA 90210\nUnited States of America"
:;;123 Main Street;Old West;CA;90210;United States of America
ADR;TYPE=home;LABEL="123 Main Street\nOld West, CA 90210\nUnited States of America"
:;; 123 Main Street;Old West;CA;90210;United States of America
EMAIL:johnwayne@example.com
REV: 20080424T195243Z
END:ELECTRONIC CARD.

A electronic card may provide any number of information segments used to provide convenience and identification of the caller. The electronic card may be part of the vCARD series of information types. Delivering electronic cards contemporaneously with a live call and/or short message service (SMS) communication may offer an increased level of optimization to a recipient of such information. An electronic card may be created for a branded product or application. This may include information segments, such as images, addresses, alternate phone contacts, email contacts, etc. among other information types. The electronic card could be hosted on a web "electronic card" server 114 in a static form and/or served up dynamically from a database-backed application.

Retrieving, forwarding and providing an electronic card in certain situations may create an optimized communication experience. In one example embodiment, a user may receive a call from a service provider call server 112 which includes voice data 124. After a predetermined period of time (e.g., 15 seconds, 30 seconds, etc.), an electronic card organization procedure may ensue that includes any of retrieving an electronic card from memory, customizing the electronic card for delivery via the electronic card server 114 and providing a message 126 with an electronic card embedded inside that is customized for the user's mobile device. Customization may include all information included in the electronic card that the user may desire based on device attributes of the mobile device 104 and/or user preferences. Alternatively, the communication session may be a short message service session via a SMS server 116 which generates and transmits SMS messages 122 to and from the user device. The electronic card would be delivered in a SMS message.

Figure 2:
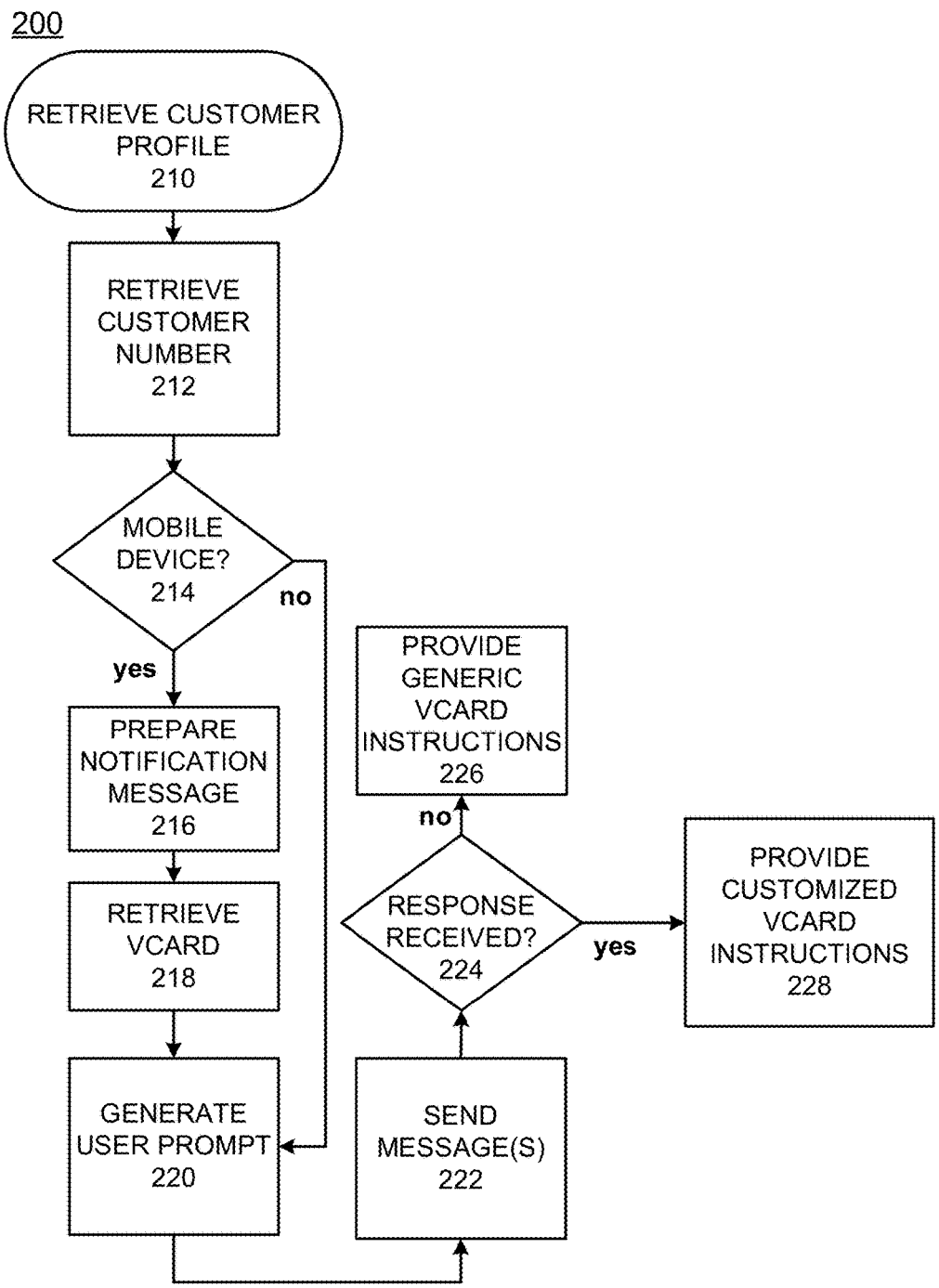
FIG. 2 illustrates an example logic flow diagram according to example embodiments.

FIG. 2 illustrates an example logic flow diagram of an electronic card communication procedure conducting during a live call or messaging session. Referring to FIG. 2, the procedure begins with retrieving a customer profile 210, such as a user name, number, email address, preferences, history, etc. The customer number 212 may be used to initiate a communication session with the mobile device. The next determination that can be performed is to determine whether the user device is a mobile device 214 or other type of communication device (i.e., landline). If the device is a mobile device, a notification may be prepared as a message 216 and electronic card may be retrieved and/or customized 218 to a user's needs and requests. A user prompt may be generated 220 to inform the user to access, download, etc., the electronic card contents. The message 222 may be sent to the user's device as a SMS message with a link or other data access format to retrieve the electronic card contents. The user may respond with certain preferences or requests via a SMS message response and if so then the user may be provided with a customized electronic card 228 or alternatively a generic electronic card 226 with basic name and/or email information.

Figure 3A:
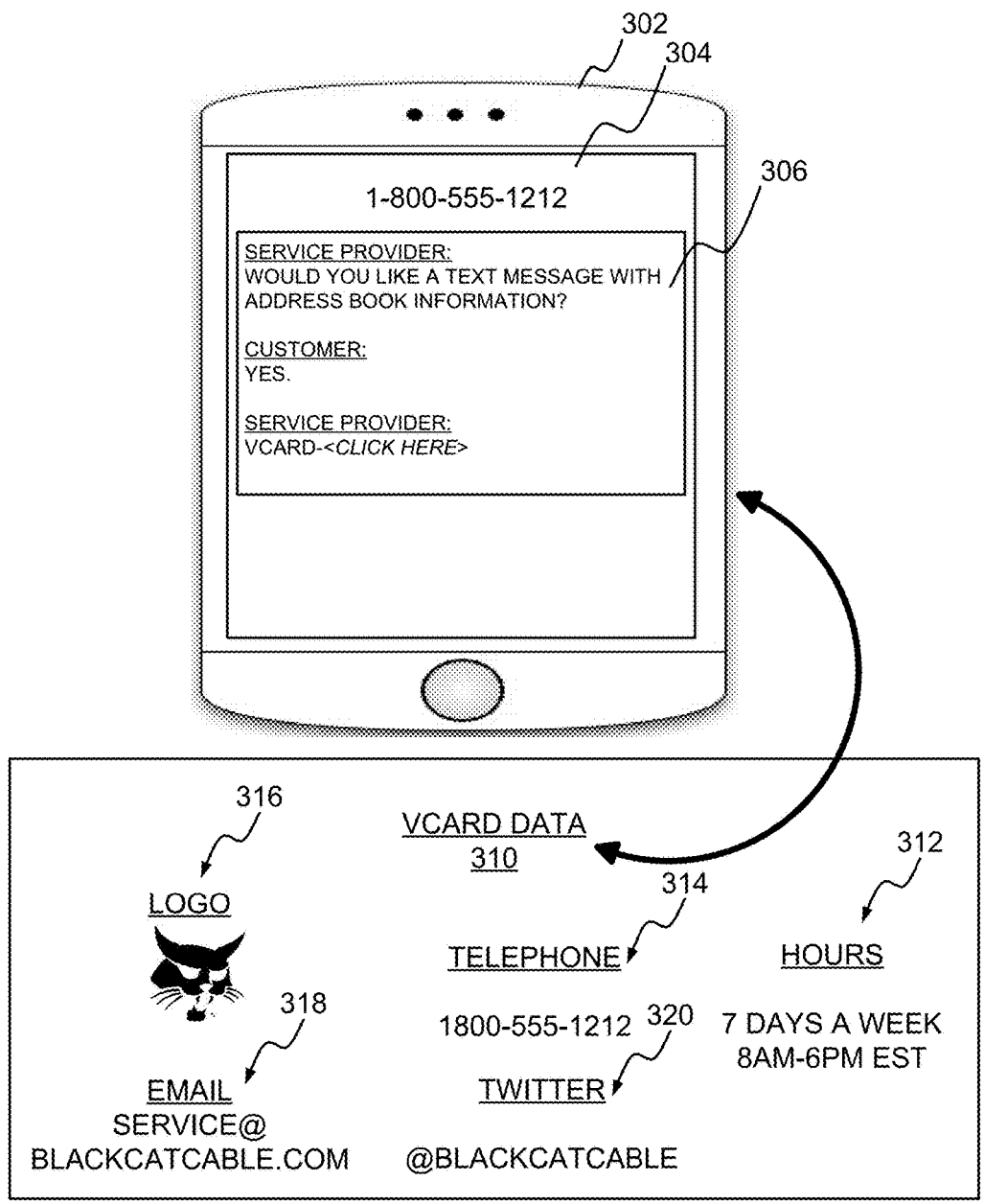
FIG. 3A illustrates an example user interface for managing the electronic card information according to example embodiments of the present application.

FIG. 3A illustrates a user interface on a user device according to example embodiments. Referring to FIG. 3A, the user device and data interface 300 includes a user device 302 with a display interface including a current number 304 and message interface 306. The electronic card data 310 may include a plurality of different data tags including a logo 316, a telephone number 314, company hours 312, an email address 318, social networking identifiers 320, etc. In operation, the dialogue of an active user call may include a voice channel being established between the user device and the calling entity. The number of the caller may appear 304 along with dialogue of the voice from the call and/or separate SMS messages 306 received and exchanged during the call. The service provider may ask questions regarding address book information to confirm that the user is trying to receive such information prior to sending the information to the user device.

Figure 3B:
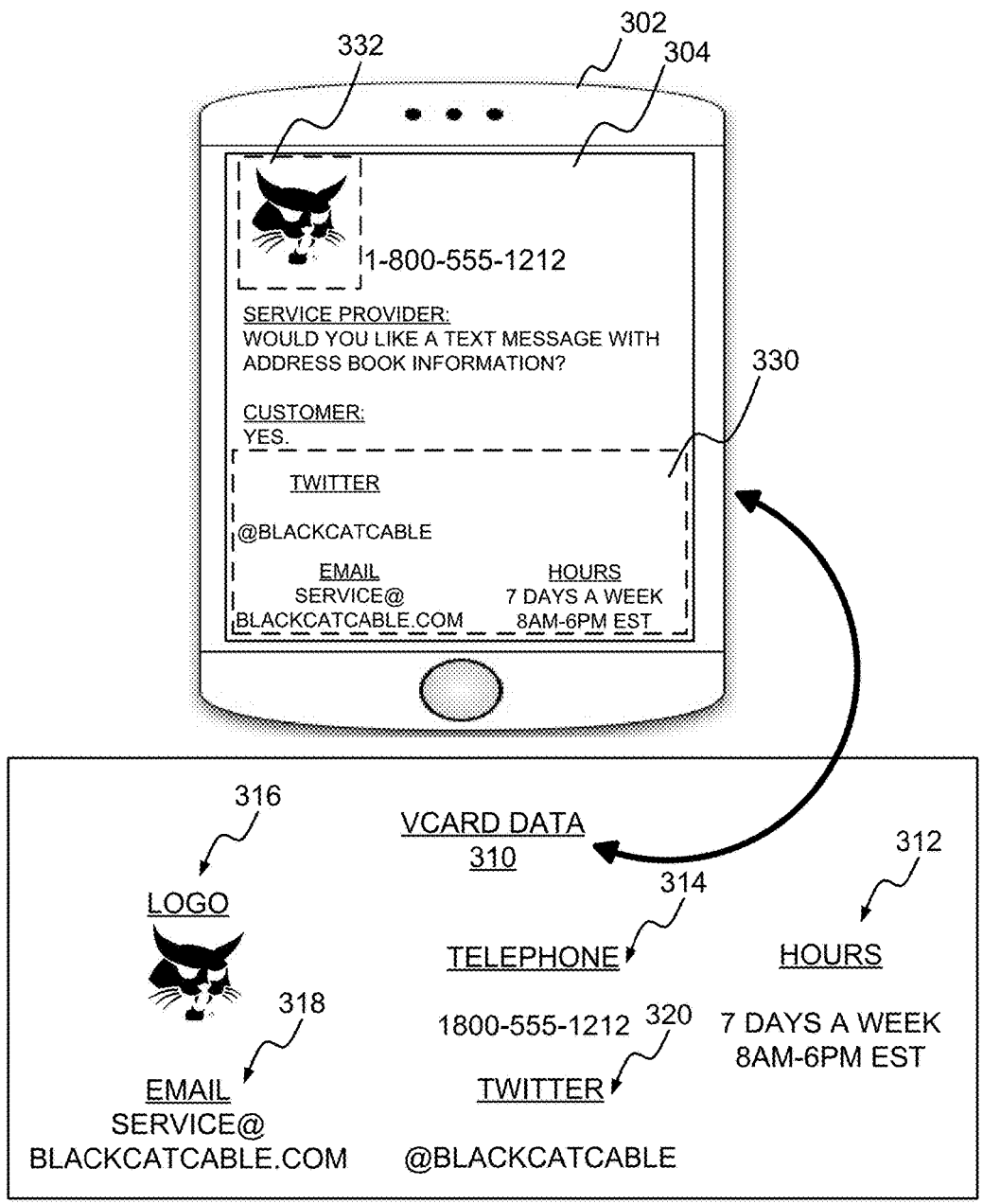
FIG. 3B illustrates an example user interface for incorporating the electronic card information into the user interface according to example embodiments of the present application.

FIG. 3B illustrates an example of the user device receiving and incorporating such information from the electronic card. For example, the user device may have accessed the electronic card via the link or another data access option and incorporated the electronic card tags including the company logo 332, the various contact information 330, etc. The information may be populated on a contact page once the electronic card is accessed. Alternatively, the information may be automatically populated after a predetermined period of time has elapsed or after a set of user preferences are identified which correlate to the information in the electronic card.

Figure 4:
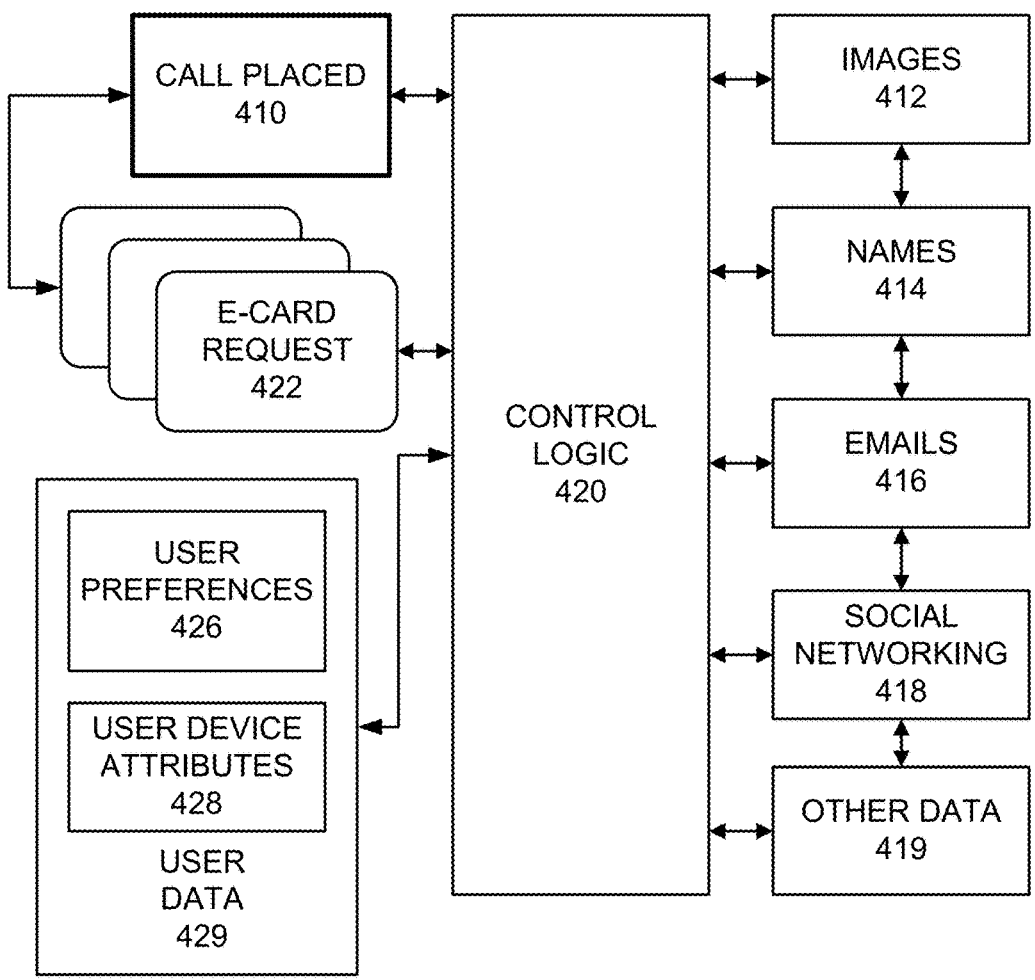
FIG. 4 illustrates an example logic diagram of the input and output data according to example embodiments of the present application.

FIG. 4 illustrates a logic configuration of data processing for a communication session. Referring to FIG. 4, the input and output data of the logic configuration 400 provides a basis for setting up and executing a communication session with information logging (i.e., contact list updates). In an initial processing operation, the call or message 410 may be transmitted to an end user device. As a result, the control logic 420 may begin to create an electronic card request 422 and identifying the end user device attributes 428 and its corresponding user preferences 426 from a set of user data 429. The control logic 420 may then customize an electronic card via images 412 associated with the caller, names 414, emails 416, social networking identifiers 418 and/or other data linked to the company 419. The electronic card can have a generic template of all the data tags or may add the tags to the generic template to create a customized electronic card for the recipient.

Figure 5A:
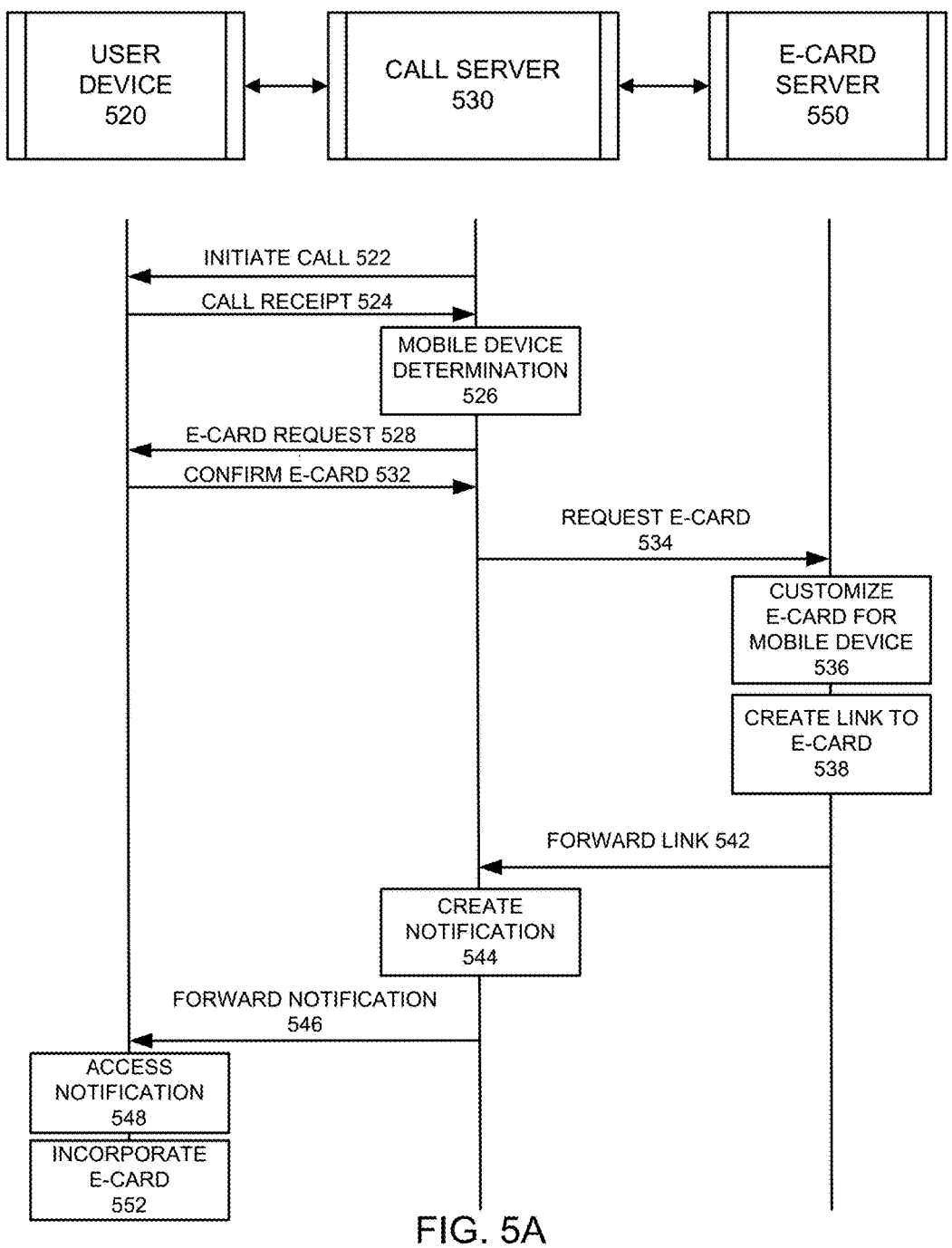
FIG. 5A illustrates an example system communication diagram of a voice call electronic card integration according to example embodiments of the present application.

FIG. 5A illustrates an example communication session 500 of a user device 520 and a call server 530 according to example embodiments. Referring to FIG. 5A, during interaction with an interactive voice response (IVR) application on a live call either outbound or inbound, the call server 530 would determine whether or not a user device a mobile phone or not to determine if we a text message can even be sent to the device. There are databases that provide assistance with this decision procedure or other third party information sources. A call may be initiated 522 from the call server 530 to the user device 520 and a call receipt 524 may be transmitted to notify the server that the call was successful. On inbound calls, indicators from the network may offer information as to the device type, such as a hardware address, mobile switching center identifiers, home location resource (HLR) database information, etc. Also, a user prompt notification may be generated and sent to the mobile device to confirm the device type 526 in the event of a failed attempt. If the user responds, a SMS text message could be sent, such as "Add us to your address book by visiting http://url.com/myco.vcf". The URL may be a static URL, or a shortened URL. When the user visits the link with the electronic card, the electronic card is delivered to their device using a standard HTTP/HTTPS protocol. The device will then initiate a prompt to the user through to add that contact record to their address book on their phone or may do so automatically.

The electronic card request 528 may be sent and a confirmation 532 may be received prior to transmitting any electronic card to the user device 520. The call server 530 may then request the electronic card 534 from an electronic card server or database 550 which may then retrieve known electronic card data and customize the electronic card for the mobile device 536 based on user preferences, device attributes or a combination of both attributes. The electronic card could then be created 538 and transmitted to the user device 520 based on the capabilities of the device and/or user preferences to have all or some of the information included in the contact list and corresponding data-tag repository. The link for the electronic card may be forwarded 542 to the call server which creates the notification message 544 with the electronic card information included. The notification can then be forwarded 546 to the user device 520 which can then access the notification 548 and incorporate the electronic card data automatically 552.

A more specific example method of operation may include transmitting a call from a calling party to a user device and establishing a call channel and transmitting a request to the user device to accept contact information associated with the calling party via a data channel separate from the call channel. The data channel may be an alternative communication medium, such as a data cellular channel as opposed to a voice cellular channel. Then, once a confirmation message is received that the request is accepted, the contact information can be identified, formatted and forwarded automatically.

The example method may also include identifying a device type associated with the user device, and creating an electronic card based on the identified device type. The contact list information may include an electronic card with a plurality of information tags associated with the calling party, such as a calling party telephone number, a calling party name, a calling party image logo, a calling party social networking identifier. The process may also include waiting a predetermined amount of time prior to transmitting the electronic card request to the user device, and automatically applying a user preference to the electronic card creation procedure. The user preference indicates which of a plurality of information tags associated with the calling party to include in the electronic card. If no preference is identified, a default set of tags or attributes will be applied to the electronic card creation and sharing procedure. One approach to sharing the e-card information may include creating a uniform resource locator (URL) to a location of user information or a formatted card format and inserting the electronic card information in memory at a location specified by the URL, and transmitting the URL to the user device in a SMS message.

In an alternative embodiment, the e-card information may be automatically identified and retrieved from a social networking profile account that is accessible via an API of the social network service. For example, responsive to a call or message received, if the call or message is a first time caller or contact, the application may seek to create an e-card by identifying the user's social networking profile and retrieving one or more of a user image, user interests, user skills, user location, user groups, user affiliations, etc. and incorporate them into the e-card creation service. The e-card may be previewed by the user prior to being forwarded to the recipient. Also, the e-card creation service may seek to only share professional information so as not to share personal information about the user with the first time caller or recipient.

Figure 5B:
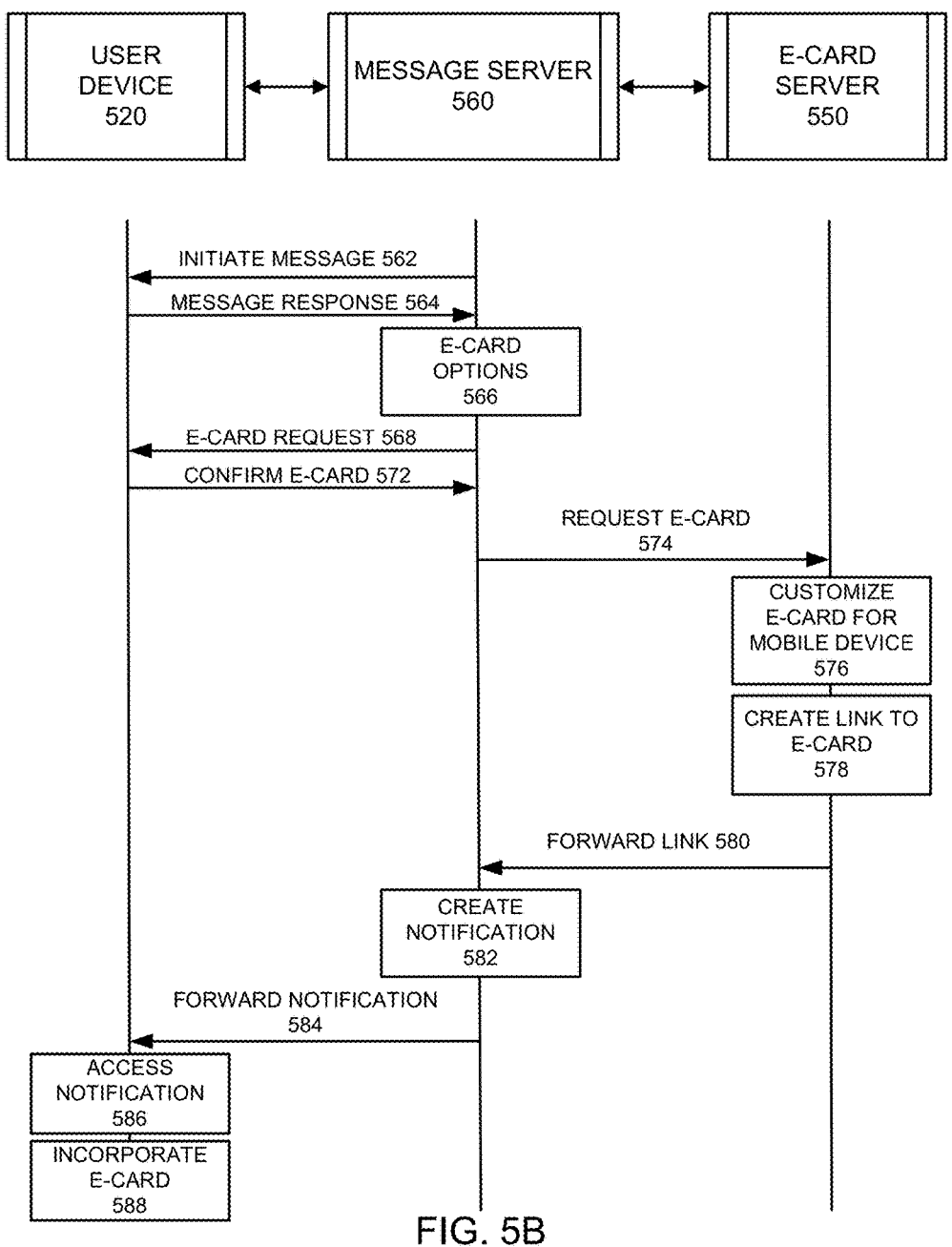
FIG. 5B illustrates an example system communication diagram of a messaging session electronic card integration according to example embodiments of the present application.

FIG. 5B illustrates an example communication session 570 of a user device 520 and a message server 560 according to example embodiments. Referring to FIG. 5B, when interacting with a SMS text messaging application either by receiving an outbound notification, or interacting with a two-way SMS application that may be user initiated, SMS 'shortcodes' may be utilized, such as 4 or 5 digit numbers, or standard 10-digit phone numbers. These numbers are not descriptive, and are normally not recognizable by users. As a result, delivering a contact card/entry to a user's mobile phone using text messaging is possible.

In FIG. 5B, the message server 560 may initiate a message 562 to the user device 520. The response 564 may be sent to confirm receipt and/or to make a selection (i.e., pay bill, order service, etc.). The message server 560 may then elect a electronic card option 566 and request a confirmation from the user device 568 prior to transferring an electronic card. Upon receiving an electronic card confirmation 572, the message server 560 may request an electronic card 574 from the electronic card server 550. Once a user accepts the electronic card, the message server 560 may request the electronic card 574 form the electronic card server. The electronic card may be customized 576 and a link may be created 578 to access the electronic card location. The link can be forwarded 580 and the notification 582 may be created and sent 548 to the user device 520. Once the access notification 586 is received and the information is retrieved 588, a new contact entry would be added to the user's phone calendar so subsequent messaging to/from that application would be appropriately branded with text and possibly pictures and there would be no confusion who is on the other side of the shortcode/longcode. As an electronic card is created for the brand/application it may include images, addresses, alternate phone contacts, email contact points, etc., or any useful information.

In one specific example method of operation, an initiation message may be transmitted from a service provider to a user device to initiate a communication session, and a request message may be transmitted to the user device to accept contact information associated with the service provider. The contact information may be transmitted responsive to receiving confirmation of the request, and then a contact information update on the user device may be performed automatically. Next, a device type associated with the user device may be determined, and then an electronic card can be created based on the identified device type. A predetermined amount of time may be waited prior to transmitting the request message to the user device, and a user preference can be automatically applied to an electronic card creation procedure responsive to receiving the confirmation message. For example, the user may have a preference to only share interests or professional information. The user's preference can be used to only retrieve work related experiences from work related social networking profiles (e.g., LINKEDIN v. FACEBOOK), which ensures the information will be professional and not personal. The user preference indicates which of a plurality of information tags associated with the service provider to include in the electronic card. A uniform resource locator (URL) can then be created and inserted in the URL, and the URL can be transmitted to the user device in a SMS message.

During interaction with the SMS application, a message notification may include a message "Add us to your address book by visiting http://url.com/myco.vcf", which would be given to the user. The URL may be a static URL or a shortened URL. It is important to note this URL example in the disclosure is for example purposes only and is in no way related to the content of this disclosure. When the user accesses link on their smartphone, the electronic card is delivered to their user device using a standard HTTP/HTTPS protocol. The phone will then take a user through a step or two to add that contact record to their address book on their phone. Also, a record of who we offered to download the electronic card may be kept so the messages are only sent and re-sent a set number of times so not to over-message a single account.

Figure 6:
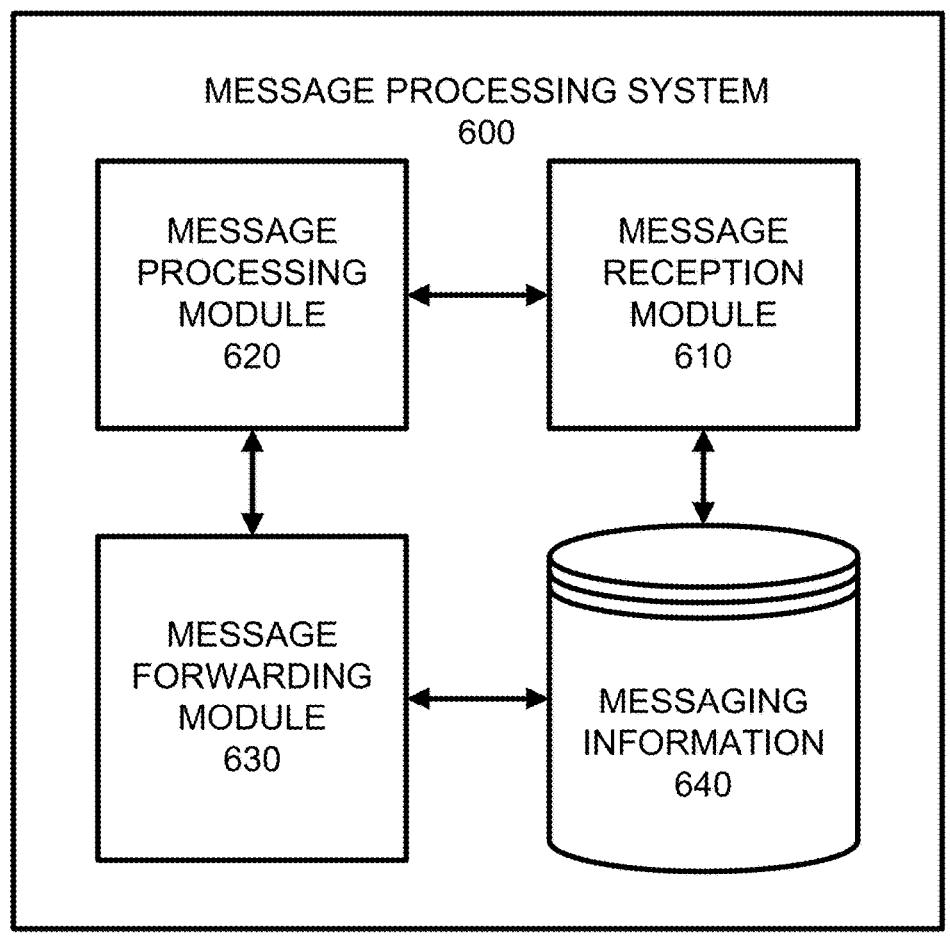
FIG. 6 illustrates an example electronic card processing system configuration according to example embodiments.

FIG. 6 is an electronic card message processing system 600 which may be a single device, multiple devices or a set of software and/or hardware modules configured to communicate with one another for the purpose of processing incoming messages, generating new messages and communicating with the user device to establish a contact list of information. The message reception module 610 may receive a confirmation or acceptance from the user device and retrieve user preferences from the messaging information memory 640 so a new message may be created via the processing module 620 and forwarded via the forwarding module 630 to the user device.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of the other figures.

Figure 7:
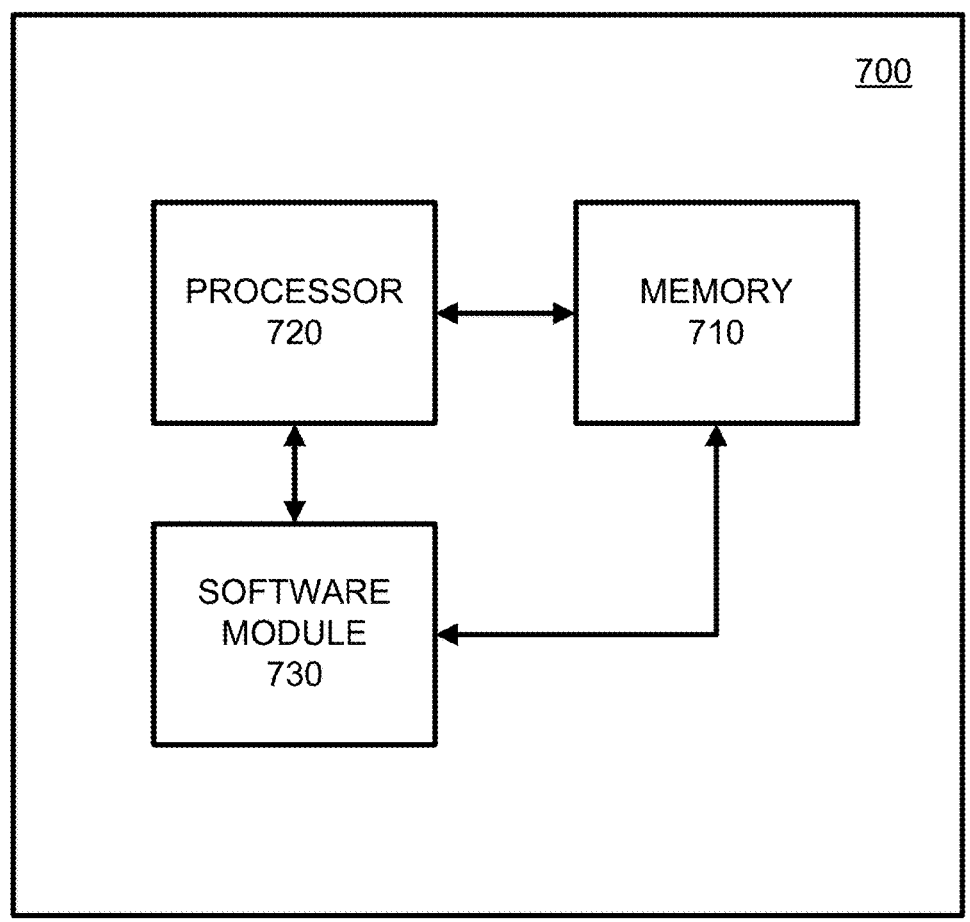
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method of a service provider device associated with a service provider, the method comprising:
    transmitting an initiation message from the service provider device to a user device to initiate a communication session between the service provider device and the user device, wherein the service provider device is an unknown device to the user device;
    transmitting a request message from the service provider device to the user device to accept contact information associated with the service provider;
    receiving a confirmation message from the user device responsive to the request message; and
    transmitting the contact information of the service provider from the service provider device to the user device thereby automatically initiating a contact information update directly from the service provider device to the user device;
    wherein the transmitting the contact information comprises:
    creating a uniform resource locator (URL);
    inserting electronic card information of the service provider in memory at a location specified by the URL; and
    transmitting the URL to the user device in a SMS message.

2. The method of claim 1, further comprising:
    identifying a device type associated with the user device; and creating an electronic card representing the service provider based on the identified device type.

3. The method of claim 1, wherein the contact information comprises an electronic card with a plurality of information tags associated with the service provider.

4. The method of claim 3, wherein the plurality of information tags comprise at least two of a service provider telephone number, a service provider name, a service provider image logo, and a service provider social networking identifier.

5. The method of claim 1, further comprising:
waiting a predetermined amount of time prior to transmitting the request message to the user device; and
automatically applying a user preference to an electronic card creation procedure responsive to receiving the confirmation message.

6. The method of claim 5, wherein the user preference indicates which of a plurality of information tags associated with the service provider to include in the electronic card.

7. The method of claim 1, wherein the contact information transmitted from the service provider device generates a display of the contact information of the service provider at the same time that the initiation message is displayed on the display screen of the user device.

8. An apparatus of a service provider device associated with a service provider, the apparatus comprising:
a transmitter configured to transmit an initiation message from the service provider device to a user device to initiate a communication session between the service provider device and the user device, wherein the service provider device is an unknown device to the user device, and transmit a request message to the user device to accept contact information associated with the service provider;
a receiver configured to receive a confirmation message from the user device responsive to the request message,
wherein the transmitter is further configured to transmit the contact information of the service provider from the service provider device to the user device to automatically initiate a contact information update directly from the service provider device to the user device; and
a processor configured to:
create a uniform resource locator (URL),
insert electronic card information of the service provider in memory at a location specified by the URL, and
cause the transmitter push the URL to the user device in a SMS message.

9. The apparatus of claim 8,
wherein the processor is configured to identify a device type associated with the user device and create an electronic card of the service provider based on the identified device type.

10. The apparatus of claim 8, wherein the contact information comprises an electronic card with a plurality of information tags associated with the service provider.

11. The apparatus of claim 10, wherein the plurality of information tags comprise at least two of a service provider telephone number, a service provider name, a service provider image logo, and a service provider social networking identifier.

12. The apparatus of claim 8, wherein the processor is configured to cause the transmitter to wait a predetermined amount of time prior to transmitting the request message to the user device and automatically apply a user preference to an electronic card creation procedure responsive to receiving the confirmation message.

13. The apparatus of claim 12, wherein the user preference indicates which of a plurality of information tags associated with the service provider to include in the electronic card.

14. A non-transitory computer readable storage medium configured to store instructions that when executed cause a processor to perform a method of a service provider device associated with a service provider, the method comprising:
transmitting an initiation message from the service provider device to a user device to initiate a communication session between the service provider device and the user device, wherein the service provider device is an unknown device to the user device;
transmitting a request message from the service provider device to the user device to accept contact information associated with the service provider;
receiving a confirmation message responsive to the request message; and
transmitting the contact information of the service provider from the service provider device to the user device thereby automatically initiating a contact information update directly from the service provider device to the user device;
wherein the transmitting the contact information comprises:
creating a uniform resource locator (URL);
inserting electronic card information of the service provider in memory at a location specified by the URL; and
transmitting the URL to the user device in a SMS message.

15. The non-transitory computer readable storage medium of claim 14, wherein the processor is further configured to perform:
identifying a device type associated with the user device; and
creating an electronic card of the service provider based on the identified device type.

16. The non-transitory computer readable storage medium of claim 14, wherein the contact information comprises an electronic card with a plurality of information tags associated with the service provider.

17. The non-transitory computer readable storage medium of claim 16, wherein the plurality of information tags comprise at least two of a service provider telephone number, a service provider name, a service provider image logo, and a service provider social networking identifier.

18. The non-transitory computer readable storage medium of claim 14, wherein the processor is further configured to perform:
waiting a predetermined amount of time prior to transmitting the request message to the user device; and
automatically applying a user preference to an electronic card creation procedure responsive to receiving the confirmation message.

19. The non-transitory computer readable storage medium of claim 18, wherein the user preference indicates which of a plurality of information tags associated with the service provider to include in the electronic card.

* * * * *